(12) United States Patent
Okazaki

(10) Patent No.: US 7,479,339 B2
(45) Date of Patent: Jan. 20, 2009

(54) VEHICLE-MOUNTED FUEL CELL STACK

(75) Inventor: Koji Okazaki, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 717 days.

(21) Appl. No.: 11/047,823

(22) Filed: Jan. 31, 2005

(65) Prior Publication Data
US 2005/0170225 A1  Aug. 4, 2005

(30) Foreign Application Priority Data
Jan. 30, 2004  (JP)  .............................. 2004-024719

(51) Int. Cl.
  *H01M 8/04*  (2006.01)
  *B60L 11/18*  (2006.01)
(52) U.S. Cl. .......................... 429/26; 429/38; 180/65.3
(58) Field of Classification Search .................. None
  See application file for complete search history.

(56) References Cited

U.S. PATENT DOCUMENTS

| | | | |
|---|---|---|---|
| 4,175,165 | A | 11/1979 | Adlhart |
| 4,508,793 | A * | 4/1985 | Kumata et al. ................. 429/26 |
| 5,776,624 | A | 7/1998 | Neutzler |
| 6,140,266 | A | 10/2000 | Corrigan et al. |
| 6,497,971 | B1 * | 12/2002 | Reiser ........................... 429/13 |
| 2001/0049040 | A1 * | 12/2001 | Grune et al. ................... 429/26 |
| 2003/0150655 | A1 * | 8/2003 | Itou ............................ 180/65.3 |
| 2004/0197620 | A1 * | 10/2004 | Arthur ........................... 429/22 |

FOREIGN PATENT DOCUMENTS

| | | |
|---|---|---|
| JP | 63-218167 | 9/1988 |
| JP | 2000-514745 | 11/2000 |
| JP | 2001-315680 | 11/2001 |
| WO | WO-98/04013 | 1/1998 |

OTHER PUBLICATIONS

U.S. Office Action for U.S. Appl. No. 11/048,689, dated Apr. 21, 2008.

* cited by examiner

*Primary Examiner*—Jonathan Crepeau
(74) *Attorney, Agent, or Firm*—Lahive & Cockfield, LLP; Anthony A. Laurentano, Esq.

(57) ABSTRACT

Vehicle-mounted fuel cell stack includes one or more cooling cells and an air allocation mechanism. Via the allocation mechanism, air flowing in a front-to-rear direction of the vehicle is introduced through reacting-air introduction openings of power generating cells and also introduced through cooling-air introduction openings of the cooling cells, so that the power generating cells can be cooled by the cooling cells. Sliding movement of the air allocation mechanism can allocate the cooling air and reacting air in desired amounts, so that it is possible to not only appropriately deal with an increase in the power generation amount but also appropriately remove excessive heat. Because the cooling cells are each constructed of thin metal plates, they can effectively remove a great amount of heat produced from power generating cells, with an enhanced efficiency.

4 Claims, 13 Drawing Sheets

VEHICLE-MOUNTED FUEL CELL STACK

FIELD OF THE INVENTION

The present invention relates to an improved vehicle-mounted fuel cell stack.

BACKGROUND OF THE INVENTION

Fuel-cell-powered vehicles known today use hydrogen as their fuel; specifically, the fuel-cell-powered vehicles are provided with a traveling motor and a fuel cell stack that generates electric power using hydrogen and oxygen, so that they can travel by electricity. One example of a conventional fuel cell assembly is known from Japanese Patent Laid-Open Publication No. SHO-54-22537, and one example of a conventional fuel cell unit for use in an automotive vehicle is known from Japanese Patent Laid-Open Publication No. 2000-514745 (WO98/04013).

FIG. 13 hereof is a perspective view showing a fundamental construction of the conventional fuel cell assembly disclosed in the above-mentioned SHO-54-22537 publication. The disclosed conventional fuel cell assembly includes fuel cell laminates 201, and bipolar plates 202 arranged alternately with the fuel cell laminates 201 and each having fuel gas channels 203 and oxygen-containing gas channels 204. With such arrangements, the fuel cell laminates 201 can be cooled naturally with air.

The conventional fuel cell unit disclosed in the above-mentioned 2000-514745 publication includes a cooling system that cools fuel cells using traveling wind produced by traveling of an electric vehicle. The disclosed conventional fuel cell unit further includes a pressure source (e.g., air blower or fan) for compulsorily passing air through the cooling system, so that the fuel cells can be cooled by the fan during low-speed travel of the vehicle or when the ambient temperature is relatively high.

However, the conventional fuel cell assembly disclosed in the SHO-54-22537 publication is not satisfactory in that heat produced in the fuel cell laminates 201 can not be dissipated or removed easily. Namely, like other polymer-electrolyte-type fuel cell assemblies today, the disclosed fuel cell assembly is constructed to produce higher outputs, which would unavoidably lead to production of greater heat; in the conventionally-known fuel cell assemblies (fuel cell stacks), about 80% of the produced heat would remain in the assembly without being consumed by heat insulation, natural dissipation etc., and heat measures of the polymer-electrolyte-type fuel cells have therefore been one of the primary concerns. Although the air-cooled type fuel cell assemblies may have an advantage of simplified construction, they suffer from a poor cooling efficiency, so that, in the case where the polymer-electrolyte-type fuel cells, designed to produce higher outputs, are employed, there may arise a possibility of the temperature of the fuel cells getting excessively high, depending on the conditions. For these reasons, there has been a great demand for an improved fuel cell construction capable of effectively eliminating the produced heat.

The conventional fuel cell unit disclosed in the 2000-514745 publication is normally incorporated where a radiator of the vehicle is mounted, so that the cell unit (fuel cell stack) can be cooled directly by the traveling wind. In this case, however, there is a need for appropriately allocating air, introduced into an engine room of the vehicle, for two purposes, cooling and electric-power generating purposes, and a need for relating the flow rate of the air (oxygen) to an increase of the amount of the generated electric power and to the temperature of the fuel cell stack. Further, in the disclosed conventional fuel cell unit, where the air is introduced directly into the unit, air-side electrodes tend to be contaminated with foreign matters, such as dust and dirt, suspended in the air, which may thus result in a lowered electric power-generating performance.

SUMMARY OF THE INVENTION

In view of the foregoing prior art problems, it is an object of the present invention to provide an improved vehicle-mounted fuel cell stack which can achieve a superior cooling effect and permits appropriate allocation between reacting air and cooling air, and which can also prevent cathode electrodes from being contaminated with foreign matters in the air.

In order to accomplish the above-mentioned object, the present invention provides an improved vehicle-mounted fuel cell stack, which comprises a plurality of power generating cells each generally in the shape of a flat plate and each including a solid polymer electrolyte (membrane) sandwiched between an anode electrode and a cathode electrode. Each of the power generating cells generates electric power through reaction, via the solid polymer electrolyte membrane, between fuel gas and reacting air supplied to the anode electrode and cathode electrode, respectively. Each of the power generating cells has, in a front end portion thereof that faces forward when the fuel cell stack is mounted on a vehicle, a reacting-air introduction opening for introducing the reacting air into the power generating cells. The vehicle-mounted fuel cell stack also includes one or more cooling cells arranged alternately with the power generating cells. Each of the cooling cells includes two opposed flat plates for passage therebetween of cooling air and has, in a front end portion thereof that faces forward when the fuel cell stack is mounted on the vehicle, a cooling-air introduction opening for introducing the cooling air between the flat plates of the cooling cell. The vehicle-mounted fuel cell stack further includes an air allocation mechanism, disposed in front of the front end portions of the power generating cells and cooling cells, for allocating air, flowing in a front-to-rear direction of the vehicle, to the reacting-air introduction openings and to the cooling-air introduction openings as the reacting air and cooling air, respectively. The air allocation mechanism is capable of adjusting an allocation ratio between the reacting air and the cooling air.

The present invention is characterized primarily by the inclusion of the cooling cells and air allocation mechanism. Via the air allocation mechanism, air flowing in the front-to-rear direction of the vehicle is introduced through the reacting-air introduction openings of the power generating cells as reacting air and also introduced through the cooling-air introduction openings of the cooling cells as cooling air, so that the power generating cells can be advantageously cooled by the cooling cells. The air allocation mechanism can also vary or adjust the amounts of the reacting air introduced through the reacting-air introduction openings of the power generating cells and the cooling air introduced through the cooling-air introduction openings of the cooling cells. Namely, the air allocation mechanism can allocate the cooling air and reacting air in desired amounts, so that it is possible to not only appropriately deal with an increase in the power generation amount but also appropriately remove excessive heat from the fuel cell stack.

In one embodiment of the present invention, each of the flat plates of the cooling cells is a thin metal plate. Using such thin metal plates can increase a total heat radiation area of the cooling cells. Thus, when the power generation amount has been increased, it is possible to effectively remove a great amount of heat produced from the power generating cells, as a result of which the present invention can achieve a superior cooling effect. Further, because the flat plates of the cooling cells are thin metal plates, a cooling-air flow passageway of each of the cooling cells, which communicates with the cooling-air introduction opening, can have a greater sectional area, and thus it is possible to reduce resistance to the flow of the introduced air. Therefore, when the power generation amount has been increased, it is possible to remove heat from the power generating cells with an enhanced efficiency, and the preset invention can achieve an even more superior cooling effect.

In one embodiment of the present invention, each of the power generating cells includes a filter disposed in the reacting-air introduction opening. The filter can remove minute dust, dirt and other foreign matters from the reacting air introduced via a cathode-side separator, so that it is possible to prevent the cathode electrodes from being contaminated with the foreign matters in the air.

In one embodiment of the present invention, the vehicle-mounted fuel cell stack further comprises a fan, provided behind rear end surfaces of the power generating cells and cooling cells that face rearward when the fuel cell stack is mounted on the vehicle, for compulsorily producing the air flowing in the front-to-rear direction of the vehicle. Thus, when the air introduced by traveling wind is weakened due to idling operation, low-speed travel of the vehicle or the like, activating the fan can keep the air introduced appropriately, so that the power generating cells are allowed to operate in a stabilized manner.

BRIEF DESCRIPTION OF THE DRAWINGS

Certain preferred embodiments of the present invention will hereinafter be described in detail, by way of example only, with reference to the accompanying drawings, in which.

DETAILED DESCRIPTION OF THE PREFERRED EMBODIMENTS

Figure 1:
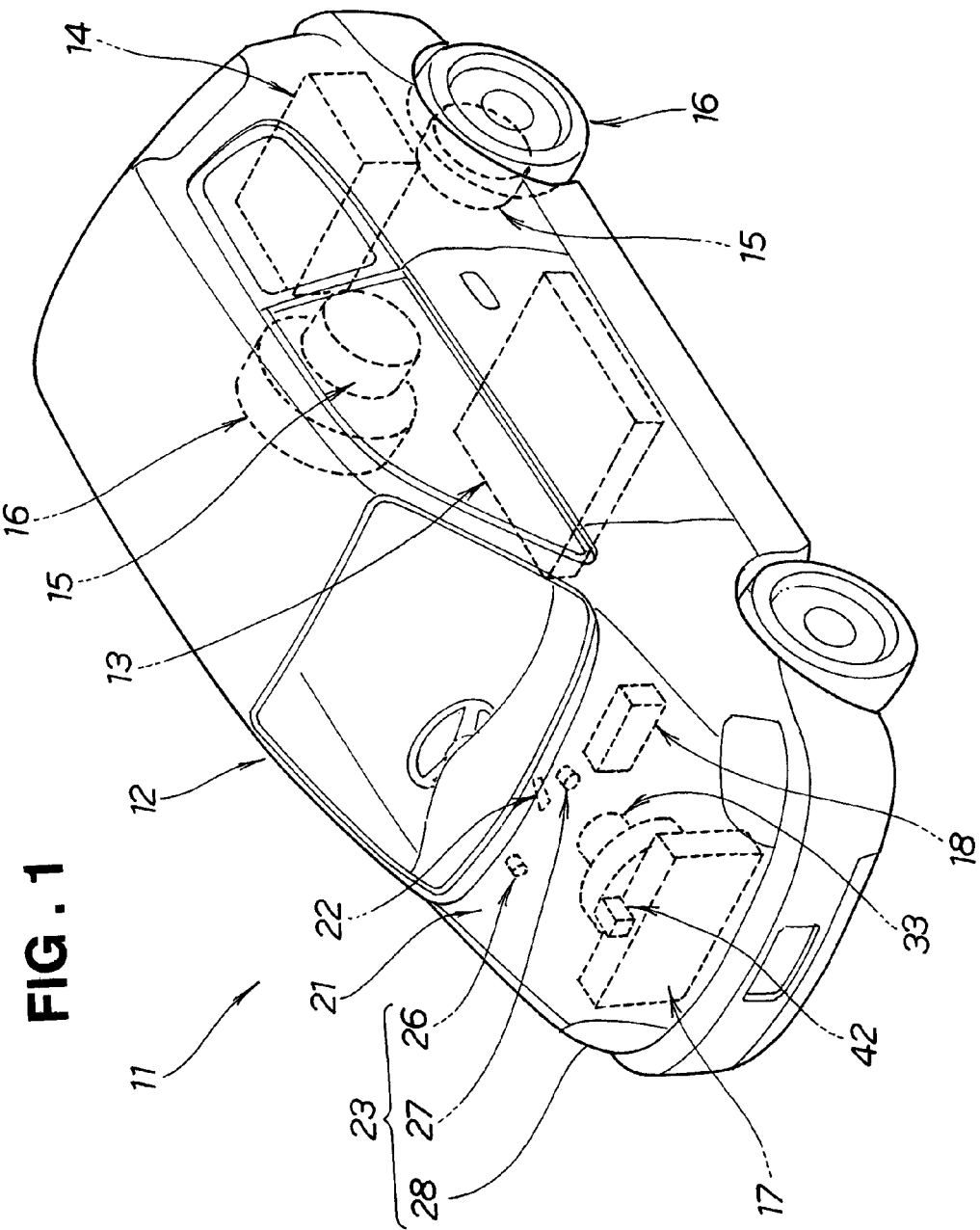
FIG. 1 is a perspective view of a vehicle employing a vehicle-mounted fuel cell stack in accordance with an embodiment of the present invention.

FIG. 1 is a perspective view of a vehicle employing a vehicle-mounted fuel cell stack in accordance with an embodiment of the present invention. The vehicle 11, which is a fuel-cell-powered vehicle running on hydrogen fuel, includes an electricity storage device 13 disposed centrally in a vehicle body 12, a hydrogen storage section 14 disposed in a rear portion of the vehicle body 12, traveling motors 15 disposed in rear portions of the vehicle body 12, and rear road wheels 16 coupled to the traveling motors 15. The vehicle 11 further includes a fuel cell stack 17 disposed in a front portion of the vehicle body 12, and a control device 18 for controlling the vehicle-mounted fuel cell stack 17. In the figure, reference numeral 21 represents an engine room, 22 an accelerator pedal, and 23 auxiliary devices. The auxiliary devices 23 are electric devices other than the traveling motors 15, such as a wiper motor 26, air conditioner motor 27 and head lamps 28.

Figure 2:
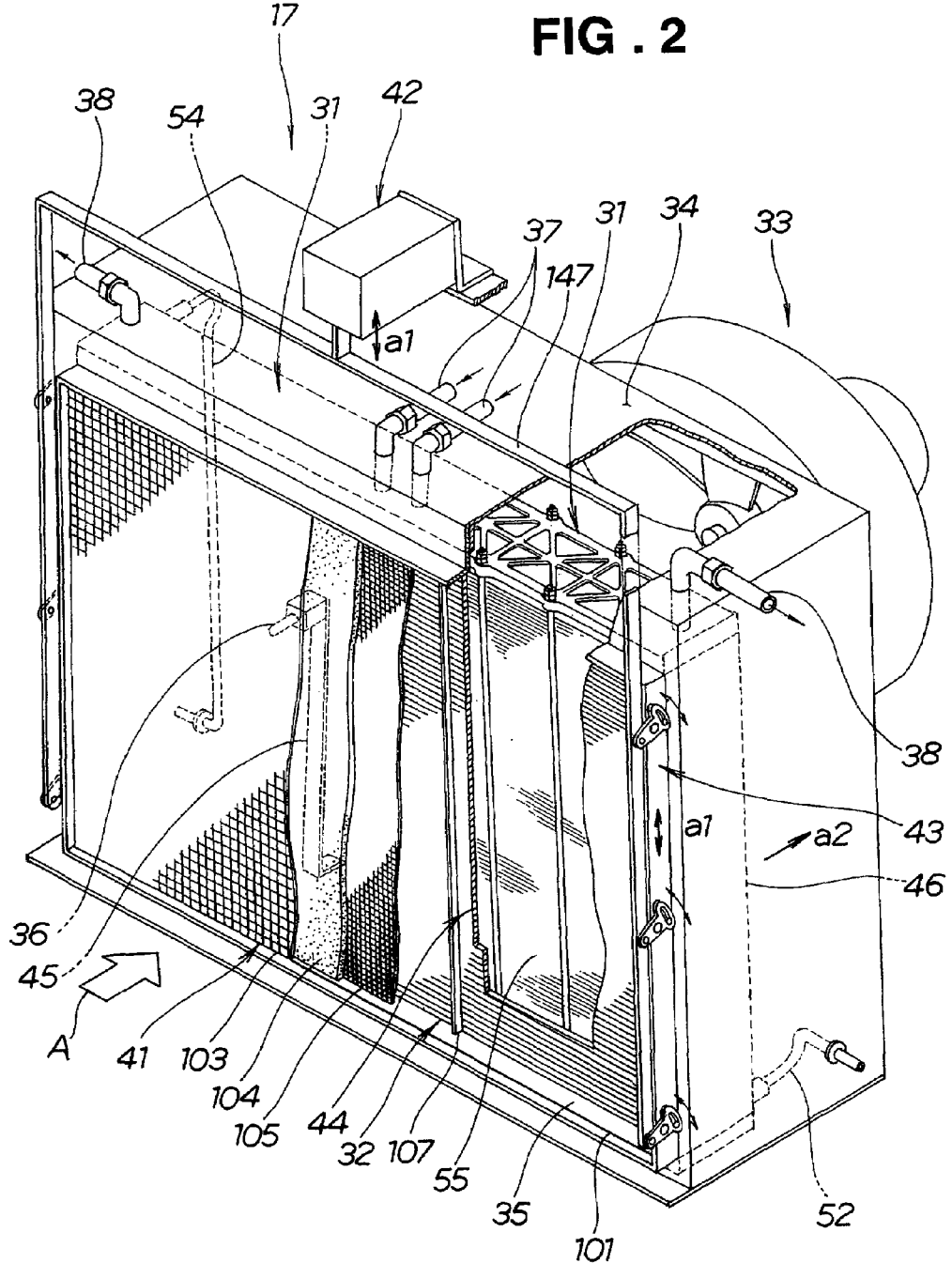
FIG. 2 is a perspective view of the vehicle-mounted fuel cell stack of the present invention.

FIG. 2 is a perspective view of the vehicle-mounted fuel cell stack of the present invention. The fuel cell stack 17 includes cell stack sections 31, an air allocation mechanism 32 disposed in front of the cell stack sections 31, a fan 33 disposed behind of the cell stack sections 31, and a cell case 34 covering the cell stack sections 31. Reference numeral 35 represents an air introducing side of the cell stack sections 31. The fuel cell stack 17 also includes temperature sensors 36 (see also FIG. 3) disposed behind of the cell stack sections 31 for detecting a temperature of the fuel cell stack, hydrogen supply tubes 37 for supplying hydrogen to the respective cell stack sections 31, hydrogen discharge tubes 38 for discharging hydrogen from the respective cell stack sections 31, and an air filter section 41 disposed in front of the air allocation mechanism 32.

The air allocation mechanism 32 includes an opening/closing drive source 42 disposed in an upper end portion of the air allocation mechanism 32, a link mechanism 43 coupled to the opening/closing drive source 42, and a valve section 44 driven via the link mechanism 43. The opening/closing drive source 42 may be in any desired form, such as a solenoid or motor, as long as it can drive the link mechanism 43 as indicated by double-headed arrow a1.

The fan 33 is a conventional electric fan that is positioned oppositely from the air introducing side 35 of the cell stack sections 31. Specifically, the fan 33 is of a suck-in type that functions to compulsorily introduce air (white arrow A) from the air introducing side 35 into the cell stack sections 31 and then discharge the air A out of the cell case 34. In other words, the fan 33 compulsorily produces air A flowing through the fuel cell stack 17 in a front-to-rear direction of the vehicle 11 (see FIG. 1), i.e. flowing rearwardly from the air introducing side 35, through the interior of the stack sections 31, beyond a rear surface 46 of the stack sections 31 (namely, in a direction of arrow a2); note that the rear surface 46 is a stack surface facing rearward when the fuel cell stack 17 is mounted on the vehicle 11.

Each of the temperature sensors 36 may be of any desired specification as long as it is capable of measuring ambient air temperatures in the range of −40 to 200° C. Each of the temperature sensors 36 is mounted near a discharge opening 97 of a power generating cell 61 (FIG. 6) via a bracket 45, and it measures a discharge temperature of reacting air Ar.

Figure 3:
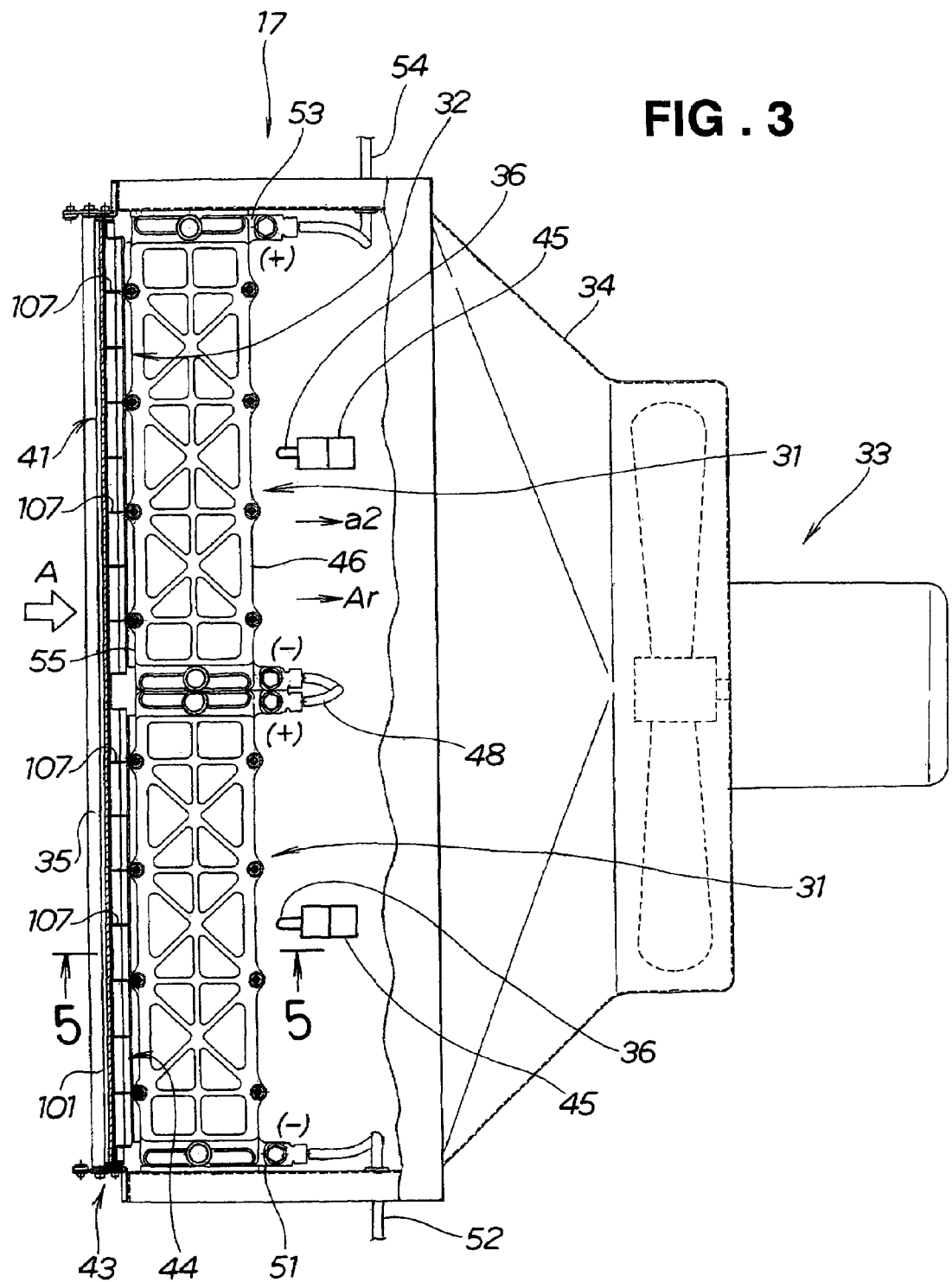
FIG. 3 is a plan view of the vehicle-mounted fuel cell stack of the present invention.

FIG. 3 is a plan view of the vehicle-mounted fuel cell stack 17 of the present invention, which includes the left and right cell stack sections 31 disposed in side-by-side relation to each other, air allocation mechanism 32 disposed on the air introducing side 35 in front of the cell stack sections 31 and fan 33 disposed behind of the rear surface 46 of the cell stack sections 31 and secured to a rear end portion of the cell case 34. In the vehicle-mounted fuel cell stack 17, the left and right cell stack sections 31 are connected in series via a first cable 48, a second cable 52 is coupled to a minus terminal 51 located at the underside of the left cell stack section 31, and a third cable 54 is coupled to a plus terminal 53 at the topside of the right cell stack section 31. Reference numeral 55 represents a front surface of the cell stack sections 31, which is a stack surface that faces forward when the fuel cell stack 17 is mounted on the vehicle 11.

Figure 4:
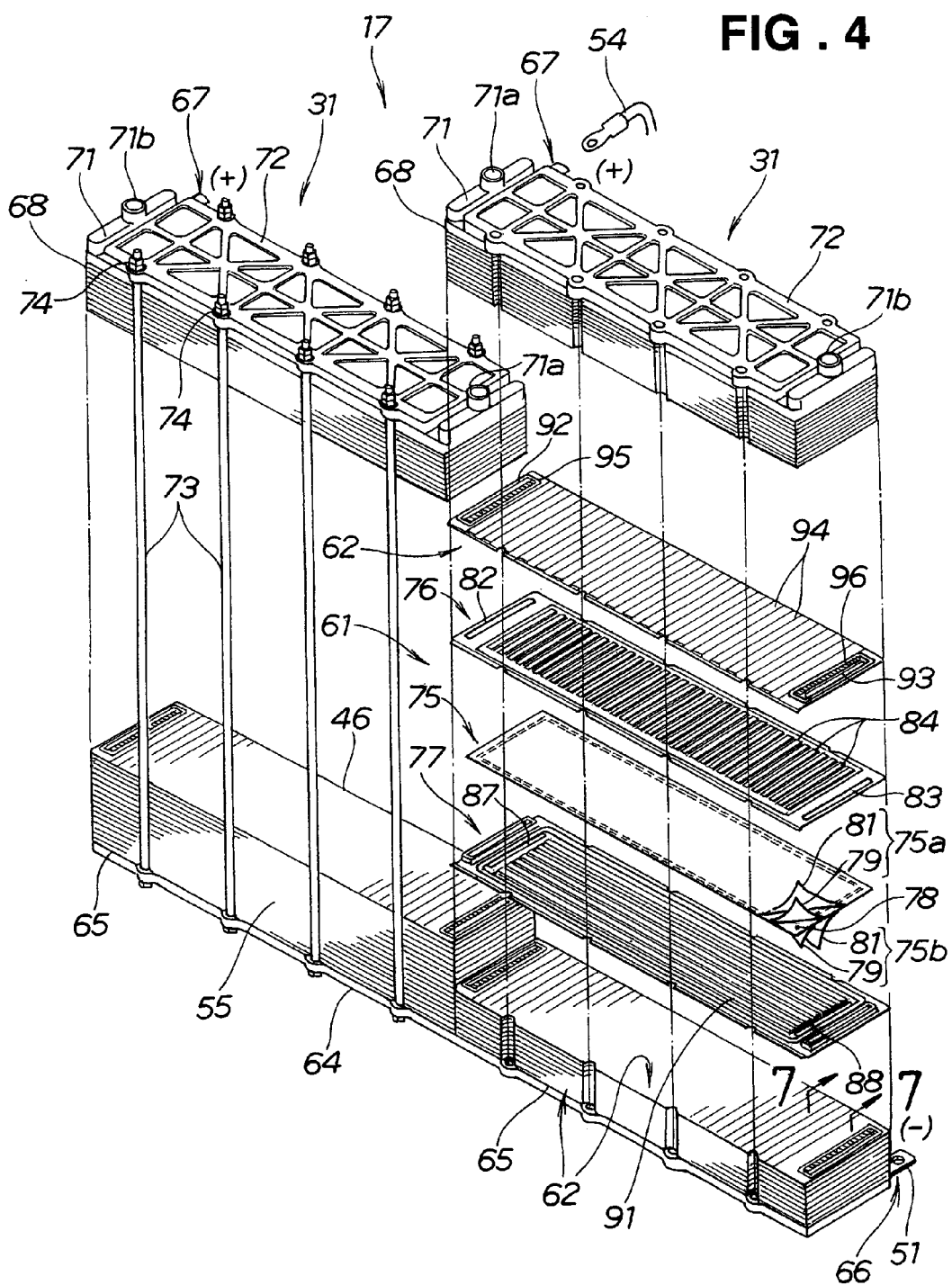
FIG. 4 is an exploded perspective view of the vehicle-mounted fuel cell stack of the present invention.

FIG. 4 is an exploded perspective view of the vehicle-mounted fuel cell stack 17, which particularly shows details of the left and right cell stack sections 31.

Each of the cell stack sections 31 generally comprises a plurality of the power generating cells 61, and a plurality of cooling-air distributing plates 62 that are disposed between the power generating cells 61 so as to function as cooling cells. More specifically, an lower end (bottom) plate 64 of an area capable of placing thereon the left and right cell stack sections 31 is first provided, then a first insulating sheet 65 is placed on a left half portion of the lower end plate 64, a first collecting conductive plate 66 is placed on the insulating sheet 65, one of the cooling-air distributing plates 62 is placed on the first collecting conductive plate 66, one of the power generating cells 61 is placed on the cooling-air distributing plate 62, and then another one of the cooling-air distributing plates 62 is placed on the power generating cells 61. Such sequential placement of the cooling-air distributing plates 62 on the power generating cells 61 is repeated until a predetermined number of the power generating cells 61 are stacked alternately with the cooling-air distributing plates 62. Then, a second collecting conductive plate 67 is placed on the uppermost power generating cell 61, a second insulating sheet 68 is placed on the second collecting conductive plate 67, an upper end plate 71 is placed on the second insulating sheet 68, a backup plate 72 is placed on the upper end plate 71, and the backup plate 72 and lower end plate 64 are secured together by means of tie rods 73 and nuts 74. The first collecting conductive plate 66 functions as a negative (minus) pole, while the second collecting conductive plate 67 functions as a positive (plus) pole.

Similarly, to provide the right cell stack section 31, the predetermined number of the power generating cells 61 are placed in a stacked configuration on a right half portion of the lower end plate 64 in the above-described manner. Backup plate 72 is placed on the stack of the power generating cells 61 via a second collecting conductive plate 67, second insulating sheet 68 and upper end plate 71. The backup plate 72 and lower end plate 64 are secured together by means of tie rods 73 and nuts 74.

Each of the power generating cells 61 includes an electrolyte/electrode structure 75, a cathode-side separator 76 held in contact with an oxygen-touching surface of the electrolyte/electrode structure 75, and an anode-side separator 77 held in contact with a hydrogen-touching surface of the electrolyte/electrode structure 75.

The electrolyte/electrode structure 75 is constructed of a solid polymer electrolyte 78 (e.g., made of perfluoro-carbon sulfonic acid type resin), electrode catalyst layers 79 formed on opposite surfaces of the solid polymer electrolyte 78, and gas diffusion layers 81 formed on the electrode catalyst layers 79.

In the illustrated example, the solid polymer electrolyte (membrane) 78 is, for example, a "Nafion" (trademark) electrolyte membrane made by DuPont Chemicals, Inc. The electrode catalyst layer 79 is formed, for example, by applying a platinum catalyst to a carbon carrier. The gas diffusion layer 81 is formed of a porous carbon paper, carbon cloth, non-woven carbon cloth, or the like.

Cathode electrode 75$a$ is constructed of the electrode catalyst layer 79 and gas diffusion layer 81 provided on an oxygen-side surface of the solid polymer electrolyte 78, and an anode electrode 75$b$ is constructed of the electrode catalyst layer 79 and gas diffusion layer 81 provided on a hydrogen-side surface of the polymer electrolyte 78.

The cathode-side separator 76 has a hydrogen supply opening 82 formed near its one end (inner end in the illustrated example), a hydrogen discharge opening 83 formed near its other end (outer end in the illustrated example), and a plurality of linear reacting-air flow passageways (or channels) 84 each extending in the front-to-rear direction, i.e. from near the front surface 55 toward the rear surface 46 of the cell stack section 31. Details of the cathode-side separator 76 will be discussed later.

The anode-side separator 77 has hydrogen supply openings 87 formed near its one (or inner) end (see also FIG. 10), hydrogen discharge openings 88 formed near its other (outer) end (see also FIG. 10), and a plurality of linear hydrogen flow passageways (channels) 91 for directing hydrogen from the hydrogen supply openings 87 to the hydrogen discharge openings 88 and also supplying hydrogen to the electrolyte/electrode structure 75. Details of the anode-side separator 77 will be discussed later.

The cooling cells (cooling-air distributing plates) 62 each have a hydrogen supply opening 92 formed near its one end (inner end in the illustrated example), a hydrogen discharge opening 93 formed near its other end (outer end in the illustrated example), a plurality of linear cooling-air flow passageways (channels) 94 extending in the front-to-rear direction, i.e. from near the front surface 55 toward the rear surface 46 of the cell stack section 31, a first flow adjusting member 95 secured near the hydrogen supply opening 92, and a second flow adjusting member 96 secured near the hydrogen discharge opening 93. Details of the cooling cell (cooling-air distributing plate) 62 will be discussed later.

In the illustrated example, the cooling cell (cooling-air distributing plate) 62 is a thin plate formed of a conductive metal material. The upper end plate 71 has a hydrogen inlet port 71$a$, and a hydrogen outlet port 71$b$.

Figure 5:
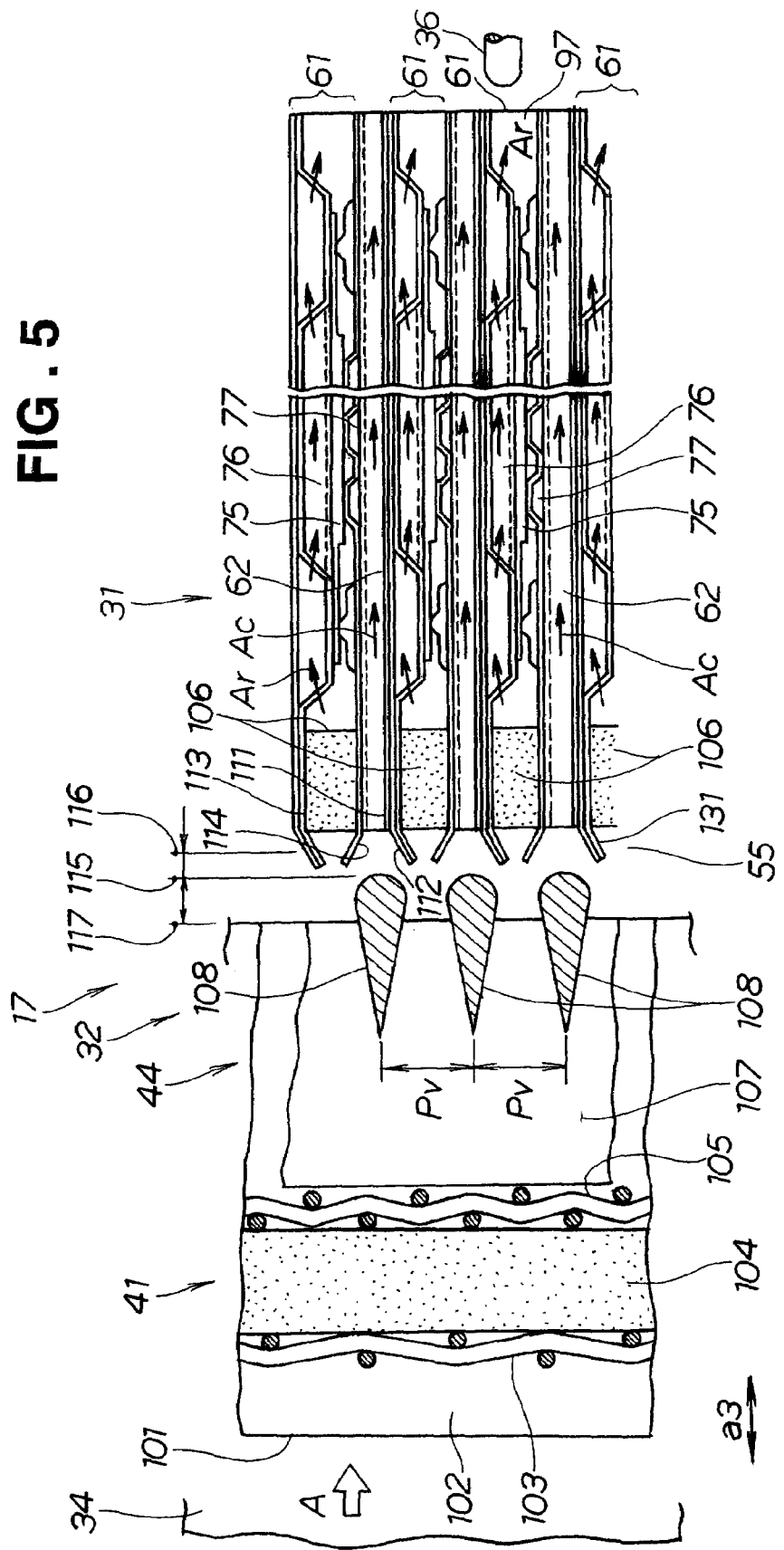
FIG. 5 is a sectional view taken along the 5-5 line of FIG. 3.

FIG. 5 is a sectional view taken along the 5-5 line of FIG. 3, which particularly shows one of the stack sections 31 of the fuel cell stack 17, air allocation mechanism 32 disposed in front of the fuel cell stack section 31, air filter section 41, and temperature sensor 36 disposed near the discharge opening 97 of one of the power generating cells 61.

The air filter section 41 includes, sequentially from an outside 102, a large-mesh metal net 103, coarse filter 104 and fine-mesh metal net 105, which are mounted on a frame 101 of the valve section 44, so as to remove dust, dirt, etc. in the air A.

Each of the power generating cells 61 also includes a fine filter 106 mounted in a reacting-air introduction opening 113 for introducing reacting air Ar into the cell 61. Detailed specification of the fine-mesh filter 106 may be chosen as desired. The reacting-air introduction opening 113 is formed in a front end portion of each of the power generating cells 61 adjacent the front surface 55.

The valve section 44 has the frame 101 fitted in the cell case 34 for sliding movement in a direction of arrow a3 and coupled with the link mechanism 43 (FIG. 2). The valve section 44 also includes: support members 107 (see also FIG. 3) mounted on the frame 101, sheet members 108 having a sectional shape of a raindrop and supported on the support members 107 at a predetermined pitch Pv; sheet surfaces 112 provided in respective cooling-air introduction openings 111 of the cooling-air distributing plates 62; and sheet surfaces 114 provided in respective reacting-air introduction openings 113 of the power generating cells 61 for opening/closing the cooling-air introduction openings 111. Each of the sheet members 108, which is normally held in an original (intermediate) position 115, is caused to slide, as necessary, between an advance limit position (or closing position) 116 and a retreat limit position (or fully-opening position) 117. Note that the cooling-air introduction opening 111 is formed in a front end portion of each of the cooling cells 62, adjacent the front surface 55, that faces forward when the fuel cell stack 17 is duly mounted on the vehicle.

Namely, in the fuel cell stack 17 of the present invention, each of the solid polymer electrolytes (electrolyte/electrode structures) 75 is held between the anode electrode 75b and the cathode electrode 75a, and fuel gas (hydrogen) is supplied to the anode electrode while reacting air Ar is supplied to the cathode electrode. The power generating cells 61, each generally in the shape of a flat plate, are provided to generate electric power by reacting the fuel gas (hydrogen) with the air. The power generating cells 61 and cooling cells (cooling-air distributing plates) 62 are stacked alternately in such a manner that each of the cooling cells (cooling-air distributing plates) 62 is interposed between adjoining two power generating cells 61, and each of the cooling cells 62 passes cooling air Ac between two opposed flat plates thereof. Each of the power generating cells 61 has the reacting-air introduction opening 113 adjacent the front surface 55 (i.e., surface facing forward when the fuel cell stack 17 is duly mounted on the vehicle 11), and each of the cooling cells 62 has the cooling-air introduction opening 111 adjacent the front surface 55. Further, in the fuel cell stack 17, the air allocation mechanism 32 is provided, in front of the front surface 55, for allocating air A, flowing in the front-to-rear direction of the vehicle 11 (see FIG. 5), to the reacting-air introduction opening 113 and cooling-air introduction opening 111 as reacting air Ar and cooling air Ac, with a variable allocation ratio.

Figure 6:
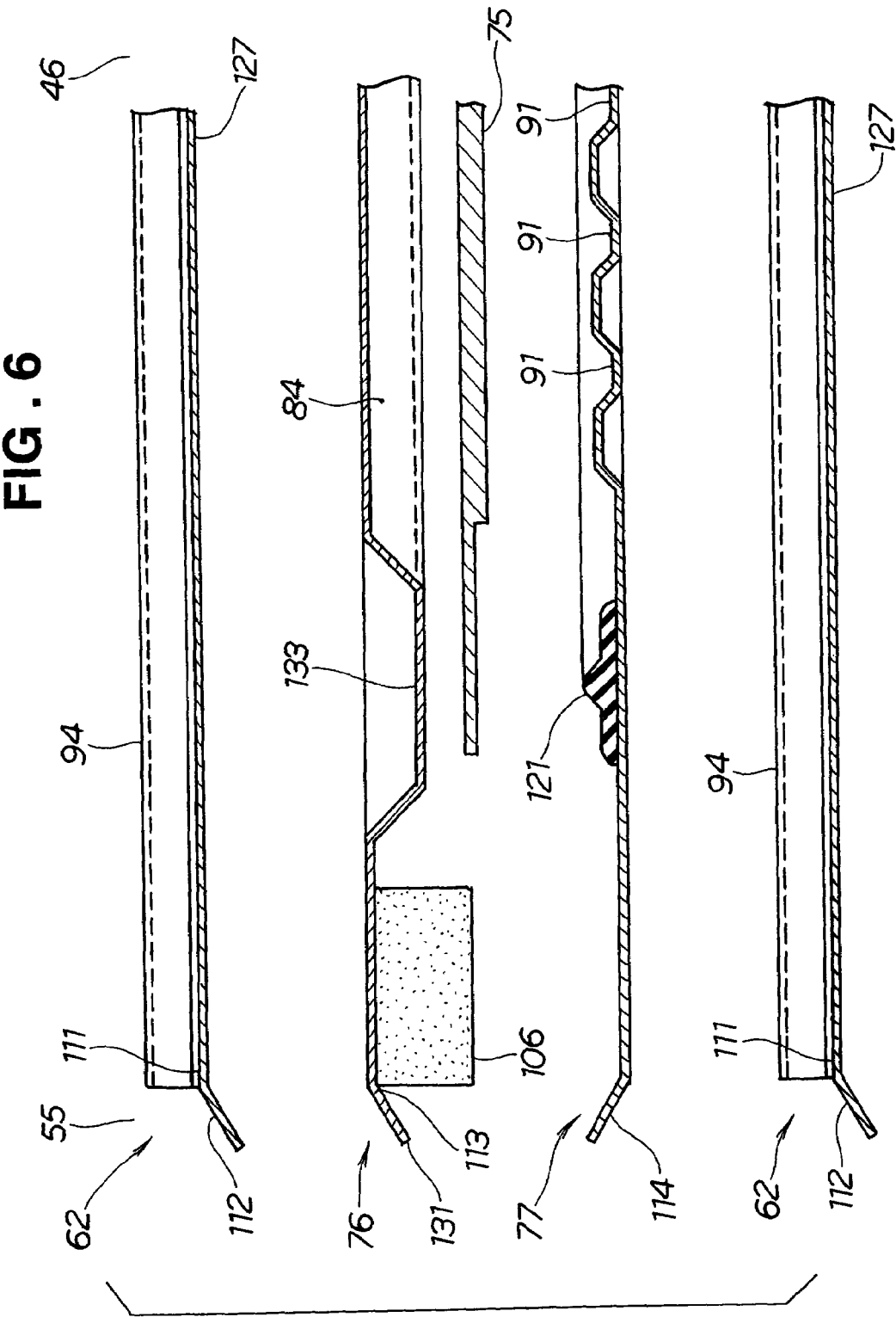
FIG. 6 is a sectional view of a power generating cell and cooling cell in the fuel cell stack of the present invention.

FIG. 6 is a sectional view of the power generating cell and cooling cell in the fuel cell stack 17 of the present invention. As shown, each of the cooling cells (cooling-air distributing plates) 62 has the plurality of linear cooling-air flow passageways 94 extending from near the front surface 55 toward the rear surface 46. Namely, the air allocation mechanism 32 is also capable of varying or adjusting the allocation ratio between the reacting air Ar and the cooling air Ac.

The cathode-side separator 76 has the plurality of linear reacting-air flow passageways 84 extending from near the front surface 55 toward the rear surface 46. The anode-side separator 77 has the linear hydrogen flow passageways 91, and a packing 121.

Figure 7:
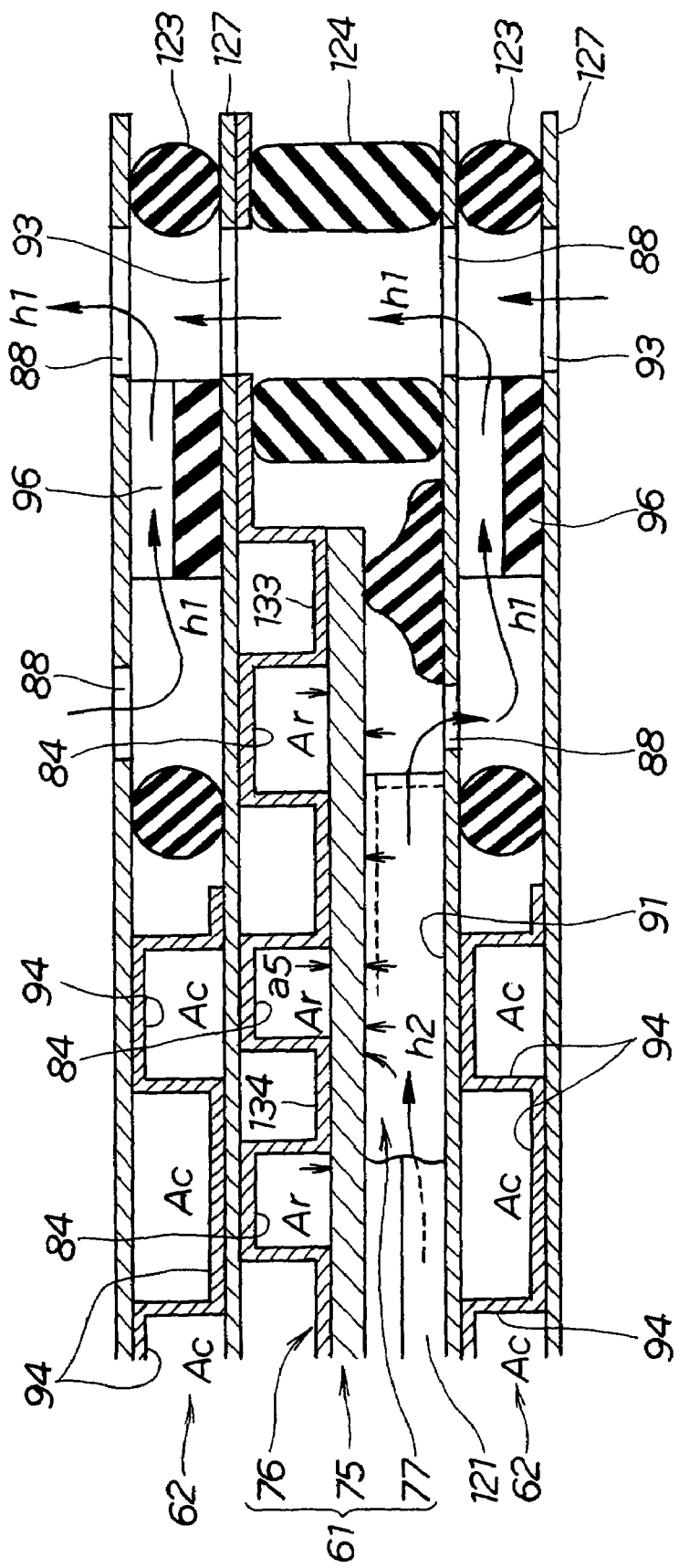
FIG. 7 is a sectional view taken along the 7-7 line of FIG. 4.

FIG. 7 is a sectional view taken along the 7-7 line of FIG. 4, which particularly shows the power generating cell 61 and cooling-air distributing plate 62. In the cooling-air distributing plate 62, the cooling-air flow passage-ways 94 direct the cooling air Ac in a direction perpendicular to the sheet of the figure, and the second flow adjusting member 96, located adjacent to the hydrogen discharge opening 93, directs hydrogen, discharged from the hydrogen discharge openings 88 of the anode-side separator 77, toward the discharge openings 88, as indicated by arrow h1, so that the hydrogen is discharged. Similarly, the first flow adjusting member 95, located adjacent to the hydrogen discharge opening 92 (FIG. 4), directs hydrogen toward the hydrogen discharge openings 87 (see FIG. 4) of the anode-side separator 77 in a direction opposite from the direction of arrow h1, although not specifically shown. Reference numeral 123 represents a seal member.

In the anode-side separator 77, the hydrogen flow passageways 91 direct hydrogen, introduced via the hydrogen supply openings 87 (FIG. 4), to the solid polymer electrolyte (electrolyte/electrode structure) 75 as indicated by arrow h2 and to the hydrogen discharge openings 88. Reference numeral 124 (see also FIG. 10) represents a seal member.

In the cathode-side separator 76, the reacting-air flow passageways 84 direct the reacting air Ar in the direction perpendicular to the sheet of the figure and also supplies the reacting air Ar to the solid polymer electrolyte (electrolyte/electrode structure) 75.

Figure 8:
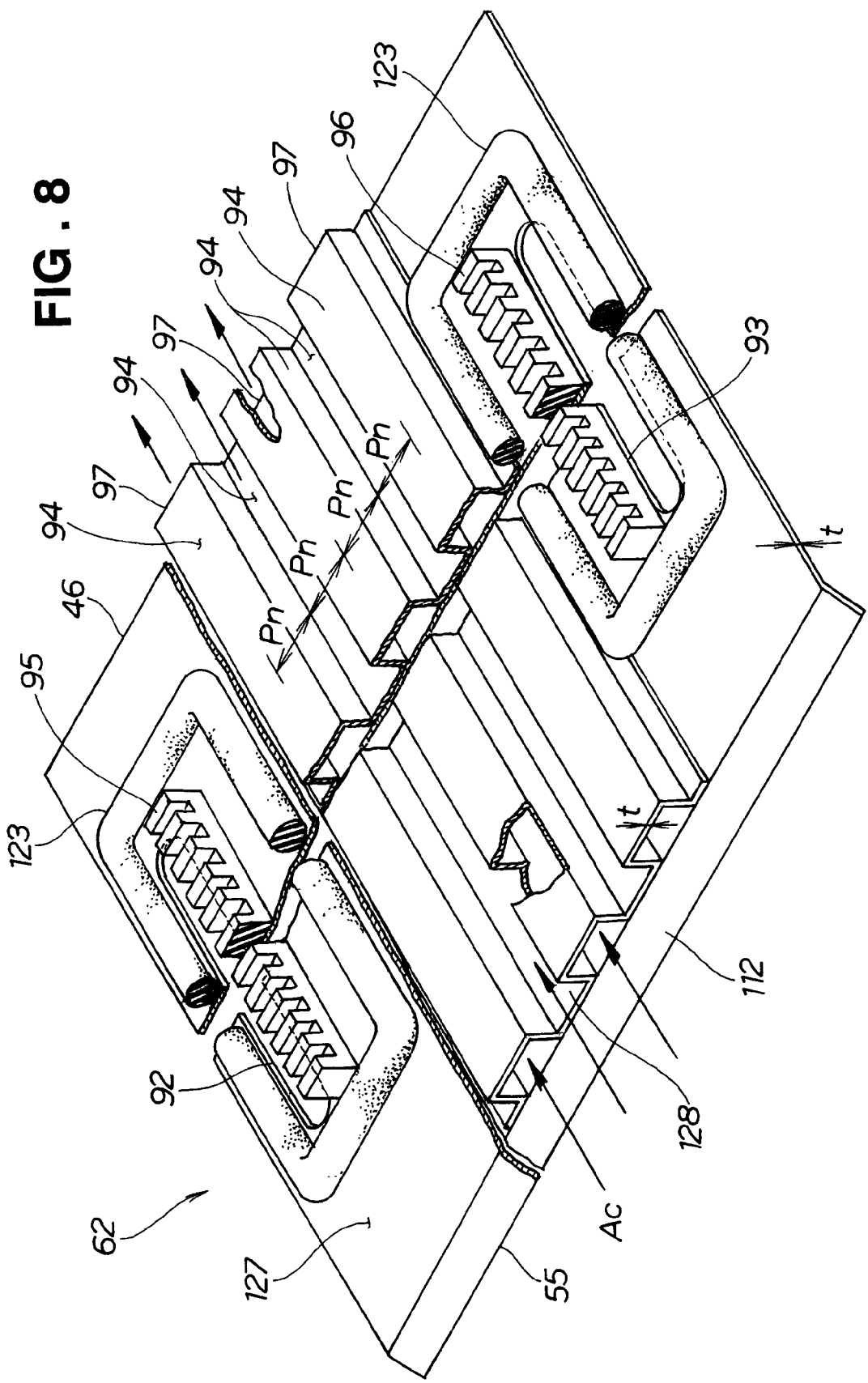
FIG. 8 is a perspective view of the cooling cell in the vehicle-mounted fuel cell stack of the present invention.

FIG. 8 is a perspective view of the cooling cell in the vehicle-mounted fuel cell stack of the present invention. As shown, each of the cooling cells (cooling-air distributing plates) 62 includes a partitioning base plate section 127 placed on the cathode-side separator 76 (see FIG. 6) and having a channel plate section 128 provided thereon, and the sheet surface 112 formed continuously with one edge of the base plate section 127. The channel plate section 128 defines a predetermined number N of the cooling-air flow passageways 94 at a predetermined pitch Pn.

Because the cooling cell (cooling-air distributing plate) 62 is composed of the partitioning base plate section 127 and channel plate section 128, the sheet surface 112 can be formed easily with no particular labor required, and the reacting-air flow passageways 84 of the cathode-side separator 76 can be simplified in construction as seen in FIG. 7.

Figure 9:
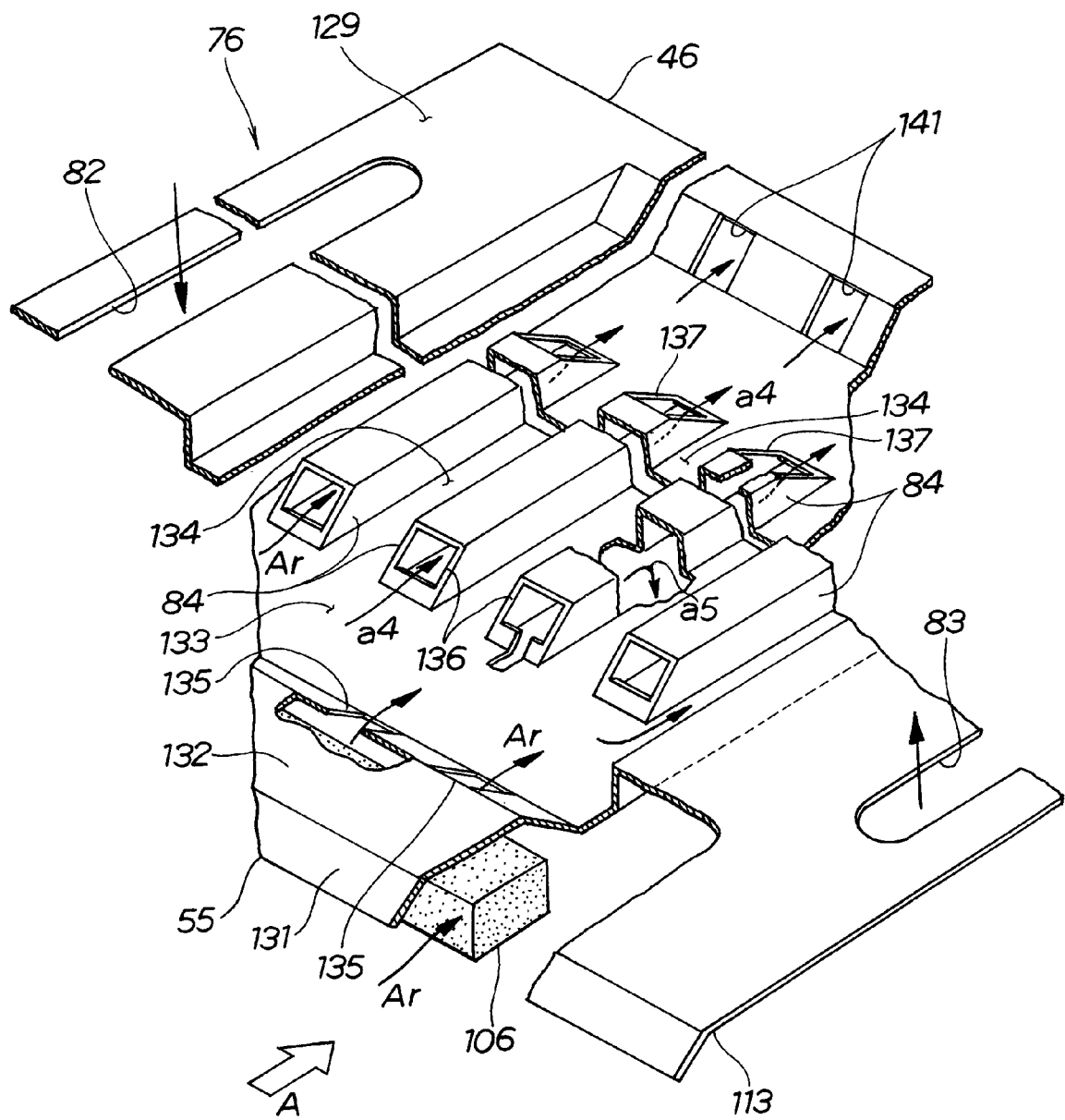
FIG. 9 is a perspective view of a cathode-side separator in the vehicle-mounted fuel cell stack of the present invention.

FIG. 9 is a perspective view of the cathode-side separator in the vehicle-mounted fuel cell stack of the present invention. Specifically, each of the cathode-side separators 76 includes a backup section 131 formed continuously with the front edge of a thin plate 129 and functioning to support the above-mentioned sheet surface 112 of the cooling cell (cooling-air distributing plate) 62, and a filter-mounting section 132 formed continuously with the backup section 131. Packing/pressing section 133 is formed around the thin plate 129, and the reacting-air flow passageways 84 are formed continuously with the packing/pressing section 133 with electrolyte retaining sections 134 formed therebetween. First openings 135 are formed in the filter-mounting section 132. Second and third openings 136 and 137 are formed in front and rear ends of the hollow reacting-air flow passageways 84, and fourth openings 141 are formed in a rear end portion of the packing/pressing section 133. Further, the hydrogen discharge opening 83 and hydrogen supply opening 82 are formed in left and right side edge portions, respectively, of the packing/pressing section 133. With such arrangements, the reacting air Ar is supplied to the solid polymer electrolyte 75, as indicated by arrow a5, as the air Ar passes along the reacting-air flow passageways 84 as indicated by arrow a4 (see also FIG. 7).

Figure 10:
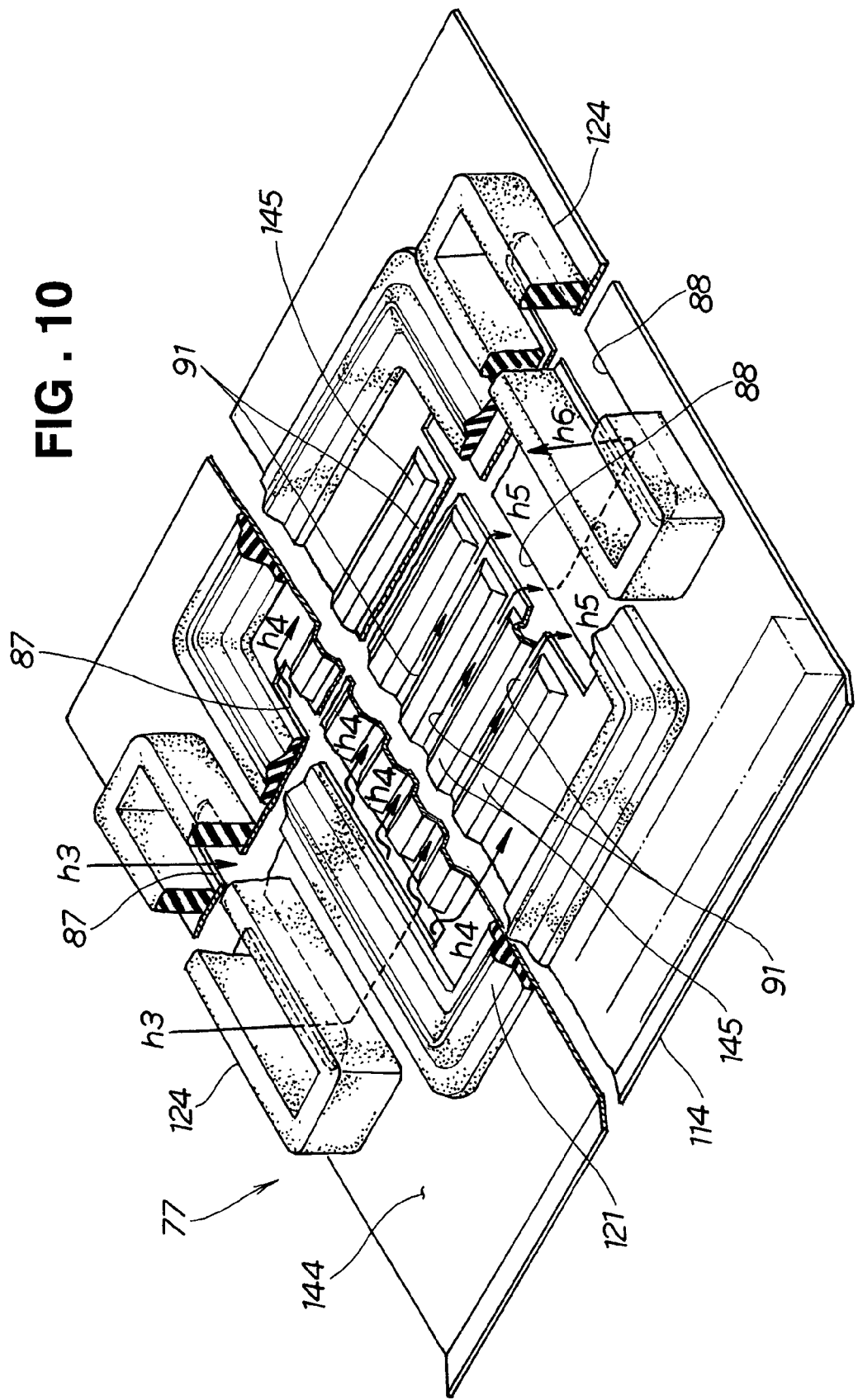
FIG. 10 is a perspective view of an anode-side separator in the vehicle-mounted fuel cell stack of the present invention.

FIG. 10 is a perspective view of the anode-side separator in the vehicle-mounted fuel cell stack of the present invention. Specifically, each of the anode-side separators 77 includes the sheet surface 114 extending continuously with the front edge of a thin plate 144, the hydrogen discharge openings 88 and hydrogen supply openings 87 are formed in left and right side edge portions of the thin plate 144, and electrolyte support sections 145 are provided centrally on the thin plate 144 with the hydrogen flow passageways 91 defined between the support sections 145. With such arrangements, hydrogen passes the first flow adjusting member 95 (FIG. 4) while flowing in the hydrogen supply openings 87 as indicated by arrow h3, and then it flows from the hydrogen supply openings 87 into the power generating cell 61 as indicated by arrow h4 and is supplied to the solid polymer electrolyte (electrolyte/electrode structure) 75 (FIG. 7) as it flows between the support sections 145. The remaining hydrogen, which has not been supplied to the polymer electrolyte 75, flows in the discharge openings 88 as indicated by arrow h5, passes the second flow adjusting member 96 (see FIG. 7) and then passes through the discharge openings 88 as indicated by arrow h6.

The packing 121 is firmly attached to the outer periphery of the polymer electrolyte 75 (see FIG. 4) to secure a pressure of hydrogen introduced between the electrolyte 75 and the anode-side separator 77.

Figure 11:
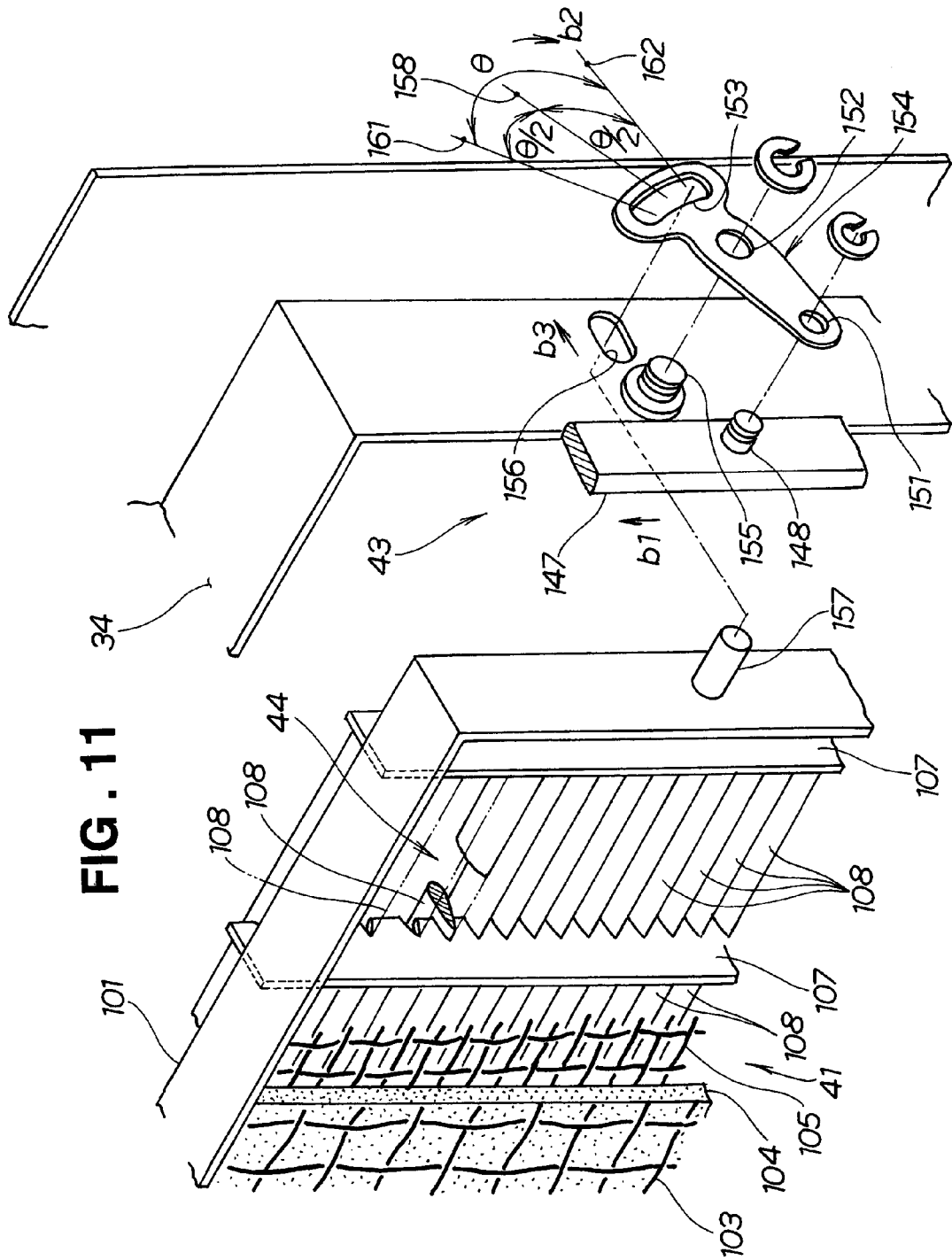
FIG. 11 is an exploded perspective view of a link mechanism of an air allocation mechanism in the vehicle-mounted fuel cell stack of the present invention.

FIG. 11 is an exploded perspective view of the link mechanism of the air allocation mechanism in the vehicle-mounted fuel cell stack of the present invention. The link mechanism 43 includes a connection bar 147 connected to the opening/closing drive source 42 (FIG. 2) and having a driving boss 148, and a pivot member 154 having a hole 151 fitting in the driving boss 148, central pivot hole 152 and eccentric elongated hole 153 formed in its distal end portion. The link mechanism 43 also includes a support boss 155 formed on the cell case 34 and fitting in the central pivot hole 152 to function as a pivot shaft, a slide hole 156 formed in the cell case 34, and a slide pin 157 formed on the frame 101 and passing through the slide hole 156 to engage with the eccentric elongated hole 153 of the pivoting member 154.

As the connection bar 147 moves upward as indicated by arrow b1, the pivot member 154 pivots through a predetermined angle $\theta$ as indicated by arrow b2, so that the slide pin 157 is pressed by the edge of the eccentric elongated hole 153 in a direction of arrow b3. Thus, the frame 101 advances together with the valve section 44 and air filter section 41 until the valve section 44 reaches the advance limit to assume the closing position. Reference numeral 158 represents an original position of the pivot member 154 which corresponds to the above-mentioned original position 115 of FIG. 5. Reference numeral 161 represents an advance limit position which corresponds to the above-mentioned advance limit position 116 of FIG. 5, and 162 a retreat limit position which corresponds to the above-mentioned retreat limit position 117 of FIG. 5.

Figure 12:
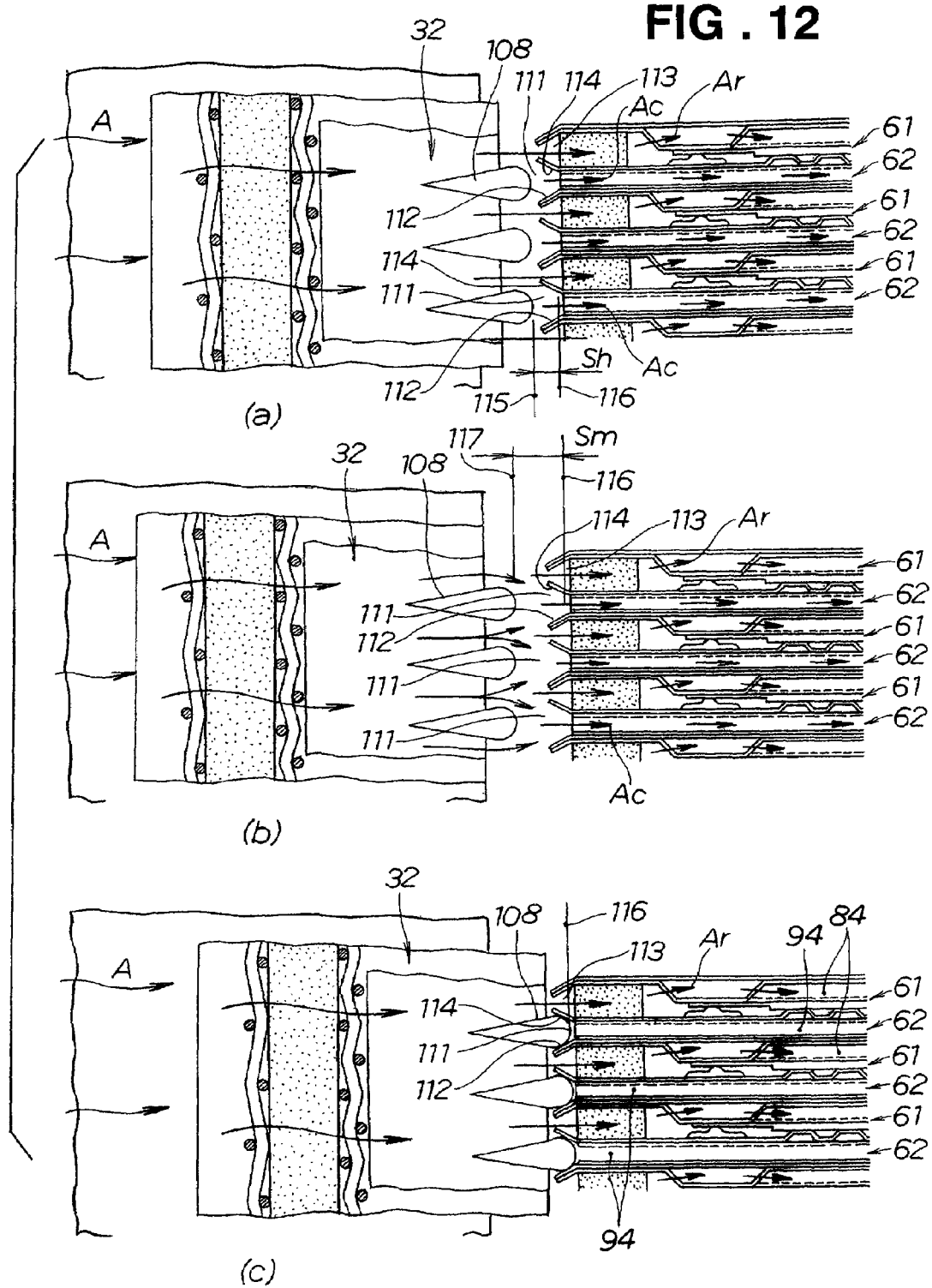
FIG. 12 is a view explanatory of behavior of the vehicle-mounted fuel cell stack of the present invention.
Figure 13:
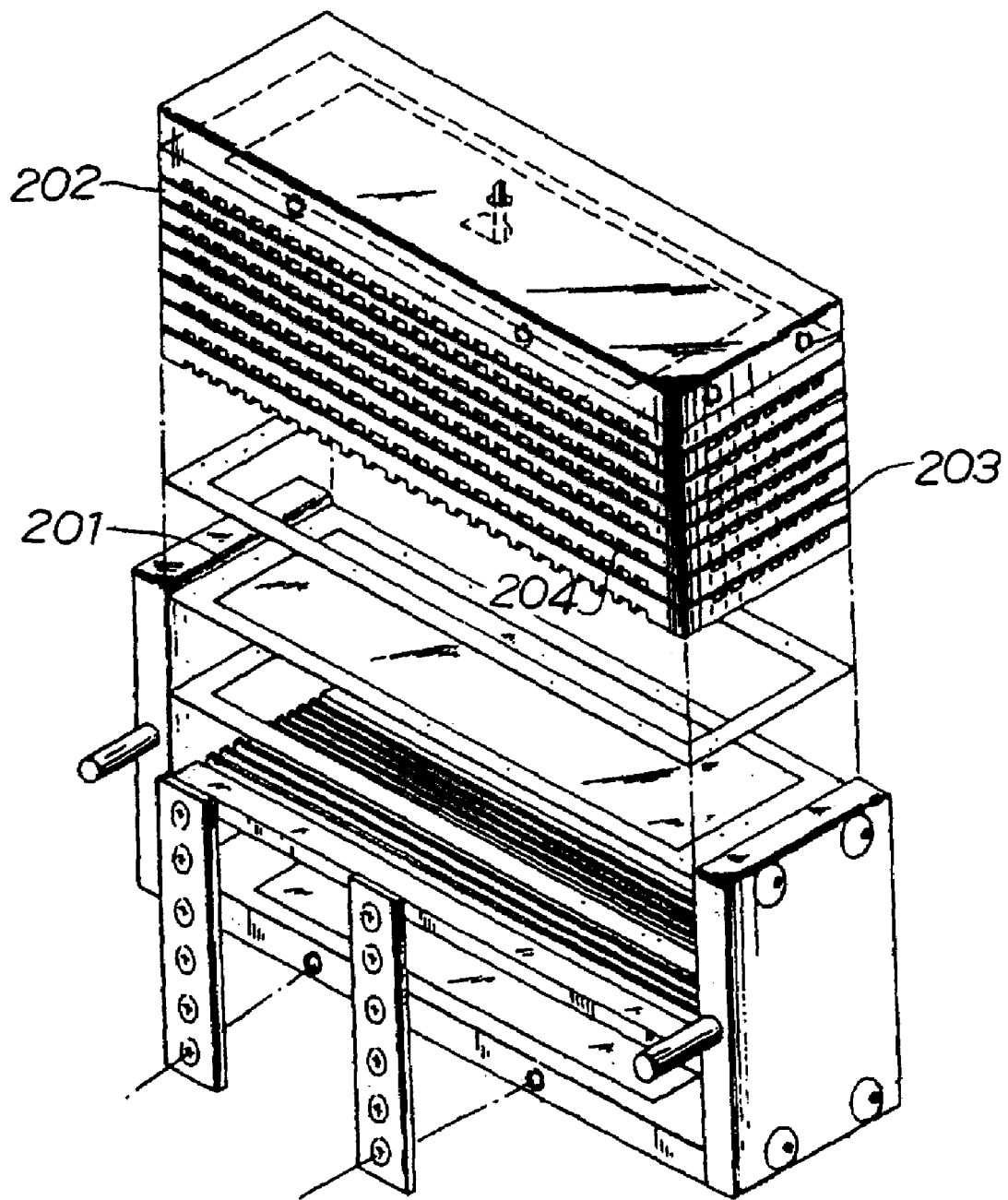
FIG. 13 is a view showing a fundamental construction of a conventional fuel cell stack.

The following paragraphs describe behavior of the vehicle-mounted fuel cell stack of the present invention, with reference to FIG. 12.

In section (a) of FIG. 12, the air allocation mechanism 32 is shown as being in the original position 115 where the mechanism 32 is open about 50%. Namely, when the air allocation mechanism 32 is in the original position 115 through driving by the link mechanism 43 (FIG. 11), the air allocation mechanism 32 is spaced apart from the cooling-air introduction openings 111 (advance limit position 116) by a distance Sh, so that the sheet surfaces 114 and 112 and the sheet members 108 are located apart from each other to provide a 50%-open state of the mechanism 32. Thus, as the vehicle is driven to travel under these conditions, air A flowing in the front-to-rear direction of the vehicle is introduced through the reacting-air introduction openings 113 of the power generating cells 61 as reacting air Ar and also introduced through the openings 111 of the cooling cells 62 as cooling air Ac. In this way, the power generating cells 61 can be cooled by the cooling cells 62.

In section (b) of FIG. 12, the air allocation mechanism 32 is shown as being in the retreat limit position 117 where the mechanism 32 is open about 100%. Namely, when the air allocation mechanism 32 is in the retreat limit position 115 through driving by the link mechanism 43 (FIG. 11), the air allocation mechanism 32 is spaced apart from the cooling-air introduction openings 111 (advance limit position 116) by a distance Sm, so that the sheet surfaces 114 and 112 and the sheet members 108 are located fully apart from each other to provide a 100-% open state of the mechanism 32. Thus, as the vehicle is driven to travel under these conditions, the air A flowing in the front-to-rear direction of the vehicle is introduced through the openings 113 of the power generating cells 61 as the reacting air Ar and also introduced through the cooling-air introduction openings 111 of the cooling cells 62 as the cooling air Ac. In this way, the amounts of the reacting air Ar and cooling air Ac can be varied from the amounts when the sheet surfaces 114 and 112 and the sheet member 108 are located apart from each other to provide an open state of 1-50%.

In section (c) of FIG. 12, the air allocation mechanism 32 is in the advance limit position 116 where the mechanism 32 is closed. Namely, when the air allocation mechanism 32 is caused to slide to the advance limit position 115 through driving by the link mechanism 43 (FIG. 11), the sheet members 108 contact the sheet surfaces 114 and 112 defining the openings 111 of the cooling cells 62. Thus, as the vehicle is driven to travel under these conditions, the air A flowing in the front-to-rear direction of the vehicle is introduced through the openings 113 of the power generating cells 61 as the reacting air Ar, but not introduced through the openings 111 of the cooling cells 62 as the cooling air Ac. In this way, the amounts of the reacting air Ar and cooling air Ac can be varied from the amounts when the sheet surfaces 114 and 112 and the sheet member 108 are located apart from each other to provide an open state of the mechanism 32.

Namely, the vehicle-mounted fuel cell stack of the present invention can allocate the cooling air Ac and reacting air Ar in desired amounts, so that it an not only appropriately deal with an increase in the power generation mount but also appropriately remove excessive heat.

The vehicle-mounted fuel cell stack of the present invention can increase a total heat radiation area by constructing the cooling cells 62 using the thin metal plates. Therefore, when the power generation amount has been increased, it is possible to effectively remove a great amount of heat produced from the power generating cells 61 (see FIG. 5). As a result, the present invention can achieve a superior cooling effect.

Namely, using the thin metal sheets in the cooling cells 62, the cooling-air flow passageways 94 can have a greater sectional area, and thus it is possible to reduce resistance to the flow of the introduced air. Therefore, when the power generation amount has been increased, it is possible to remove heat from the power generating cells 61 with an enhanced efficiency, and the preset invention can achieve an even more superior cooling effect.

In the vehicle-mounted fuel stack of FIG. 5, where the power generating cells 61 each include the fine filter 106 positioned in the reacting-air introduction opening 113 as seen in FIG. 5, the fine filter 106 can remove minute dust, dirt and other foreign matters from the reacting air Ar, so that it is possible to prevent the cathode electrodes 75*a*, i.e. the cathode side gas diffusion layers 81 and electrode catalyst layers 79, from being contaminated with the foreign matters in the air.

Further in the vehicle-amounted fuel cell stack of the present invention, the fan 33 is provided on the side of the cell stack sections 31 opposite from the air introducing side 35 and behind the rear surface 46, as seen in FIGS. 2 and 3. Thus, when the air A introduced by traveling wind is weakened during idling operation, low-speed travel of the vehicle 11 or the like, activating the fan 33 can keep the air A appropriately introduced, so that the power generating cells 61 (see FIG. 5) can operate in a stabilized manner.

It should be appreciated that, whereas the vehicle-mounted fuel cell stack of the present invention has been described above as applied to a fuel-cell-powered vehicle, it may be applied to any other vehicles including two-wheeled vehicles.

However, the vehicle-mounted fuel cell stack of the present invention is particularly suited for use in fuel-cell-powered vehicles.

Obviously, various minor changes and modifications of the present invention are possible in the light of the above teaching. It is therefore to be understood that within the scope of the appended claims the invention may be practiced otherwise than as specifically described.

What is claimed is:

1. A vehicle-mounted fuel cell stack system, comprising:
   a plurality of power generating cells each of which is generally in a shape of a flat plate and includes a solid polymer electrolyte membrane sandwiched between an anode electrode and a cathode electrode,
   each of said power generating cells generating electric power through reaction, via the solid polymer electrolyte membrane, between fuel gas and reacting air supplied to the anode electrode and cathode electrode, respectively,
   each of said power generating cells having, in a front end portion thereof that faces forward when said fuel cell stack is mounted on a vehicle, a reacting-air introduction opening for introducing the reacting air into said power generating cell, the reacting-air introduction opening being exposed to an ambient environment;
   one or more cooling cells arranged alternately with said power generating cells,
   each of said cooling cells including two opposed flat plates for passage therebetween of cooling air and having, in a front end portion thereof that faces forward when said fuel cell stack is mounted on the vehicle, a cooling-air introduction opening for introducing the cooling air between the flat plates of said cooling cell, the cooling-air introduction opening being exposed to the ambient environment; and
   an air allocation mechanism, disposed directly in front of the front end portions of said power generating cells and cooling cells, for allocating air, flowing in a front-to-rear direction of the vehicle, to the reacting-air introduction openings and to the cooling-air introduction openings as the reacting air and the cooling air, respectively, said air allocation mechanism being capable of adjusting an allocation ratio between the reacting air and the cooling air.

2. A vehicle-mounted fuel cell stack system as claimed in claim 1 wherein each of the flat plates of said cooling cells is a thin metal plate.

3. A vehicle-mounted fuel cell stack system as claimed in claim 1 wherein each of said power generating cells includes a filter disposed in the reacting-air introduction opening.

4. A vehicle-mounted fuel cell stack system as claimed in claim 1 which further comprises a fan, provided behind rear end surfaces of said power generating cells and cooling cells that face rearward when said fuel cell stack is mounted on the vehicle, for compulsorily producing the air flowing in the front-to-rear direction of the vehicle.

* * * * *